United States Patent [19]

Schneider

[11] 4,445,586
[45] May 1, 1984

[54] MOUNTING MEANS FOR A STEERING CYLINDER

[75] Inventor: Werner Schneider, Deidesheim, Fed. Rep. of Germany

[73] Assignee: Deere & Company, Moline, Ill.

[21] Appl. No.: 409,387

[22] Filed: Aug. 19, 1982

[30] Foreign Application Priority Data

Aug. 27, 1981 [EP] European Pat. Off. ........ 81106656.2

[51] Int. Cl.³ .......................... B60B 35/10; B62D 5/06
[52] U.S. Cl. ..................................... 180/132; 24/458; 24/339; 180/79.1; 248/74.3; 403/397
[58] Field of Search .................... 180/132, 79.1, 154, 180/157; 224/30 R; 248/74.3, 74 A, 302, 500; 24/261 R, 339; 403/397; 92/161, 146

[56] References Cited

U.S. PATENT DOCUMENTS

| 2,636,704 | 4/1953 | Norberg | 248/302 X |
| 3,220,680 | 11/1965 | Williams | 248/302 X |
| 3,740,803 | 6/1973 | Arteburn | 24/261 R |

Primary Examiner—Joseph F. Peters, Jr.
Assistant Examiner—Mitchell J. Hill

[57] ABSTRACT

A mounting device for a steering cylinder, for example of a tractor, with an adjustable-track front axle. The mounting device comprises a multiply bent spring arm having an eye which can be releasably mounted to the half axle through the use of a plug member or a bolt threadably fixed to the axle. The spring arm has loops which engage around the steering cylinder and which receive the hydraulic oil connection thereof, in order to prevent undesirable twisting which can cause damage to the hydraulic lines.

4 Claims, 5 Drawing Figures

MOUNTING MEANS FOR A STEERING CYLINDER

BACKGROUND OF THE INVENTION

The invention relates to a mounting means for mounting a hydraulic steering cylinder in the region of an adjustable-track front axle of an agricultural machine, in particular, a tractor.

The use of steering cylinders of the above-described arrangement is known. Such steering cylinders generally have a main cylinder body which is round and which carries radial hydraulic oil inlet and outlet connections. Generally, there are two connections, one being disposed at the lower end of the cylinder body and the other at the upper end. However, it is also possible to use hydraulic cylinders which have only a single external connection, more particularly in the case of a steering system having respective steering cylinders on the left-hand and the right-hand half axles, which cylinders are connected together and can each be pressure-actuated only in one direction or the other. Such conventional hydraulic cylinders may be mounted by a mounting member having a ball joint for homokinetically mounting the hydraulic cylinder.

This is important with regard to the envisaged installation as a steering cylinder, as the cylinder must perform certain horizontal and vertical movements substantially parallel to the half axle but deviating therefrom to a certain extent, depending on the construction and the turning circle of the steered wheels.

Generally, the steering cylinder is installed in such a way that the cylinder body lies in the direction of the center of the axle and the piston is at the end towards the steering arm. In principle, a reversal of that mounting is also possible. Such an arrangement gives rise to the problem that, as a result of its homokinetic mounting, the hydraulic steering cylinder has a degree of freedom in regard to rotary movement about its own axis. This means that the connections and the hydraulic conduits connected thereto are not fixed. As a result of their position near to the half axle or the track rod, respectively, there is the danger that the steering cylinder connections, or at least the hydraulic conduits connected thereto, due to the rotary movement, may move into the region of the adjacent components which are removed, relative to the steering cylinder, so that damage could occur at that point. This applies more particularly with regard to the track rod which is arranged to provide for track adjustment and which is provided with corresponding screwbolts, sleeves, etc., which project radially at its periphery. Due to the large relative movements of such components, the hydraulic conduits may be damaged in the event of contact occurring.

SUMMARY OF THE INVENTION

An object of the present invention is to provide a mounting means for a hydraulic cylinder which prevents rotation of the cylinder body, and its connections and hydraulic conduits, out of a predetermined position.

This and other objects are achieved by the present invention which includes a spring arm and an optional plug element which can be releasably inserted into an open bore in the row of holes which are otherwise provided for screwing together the adjustable-track half axle. The spring arm can be releasably fitted to the pin-like head of the plug element which is remote from the insertion end, or to the head of the screw bolt which serves for screwing together the half axle. The spring arm has an eye which receives the head and a wire coil which engages around the steering cylinder at the hydraulic oil inlet or outlet connection.

The invention will now be described with reference to an embodiment showing further advantages and features of the invention.

DETAILED DESCRIPTION

Figure 1:
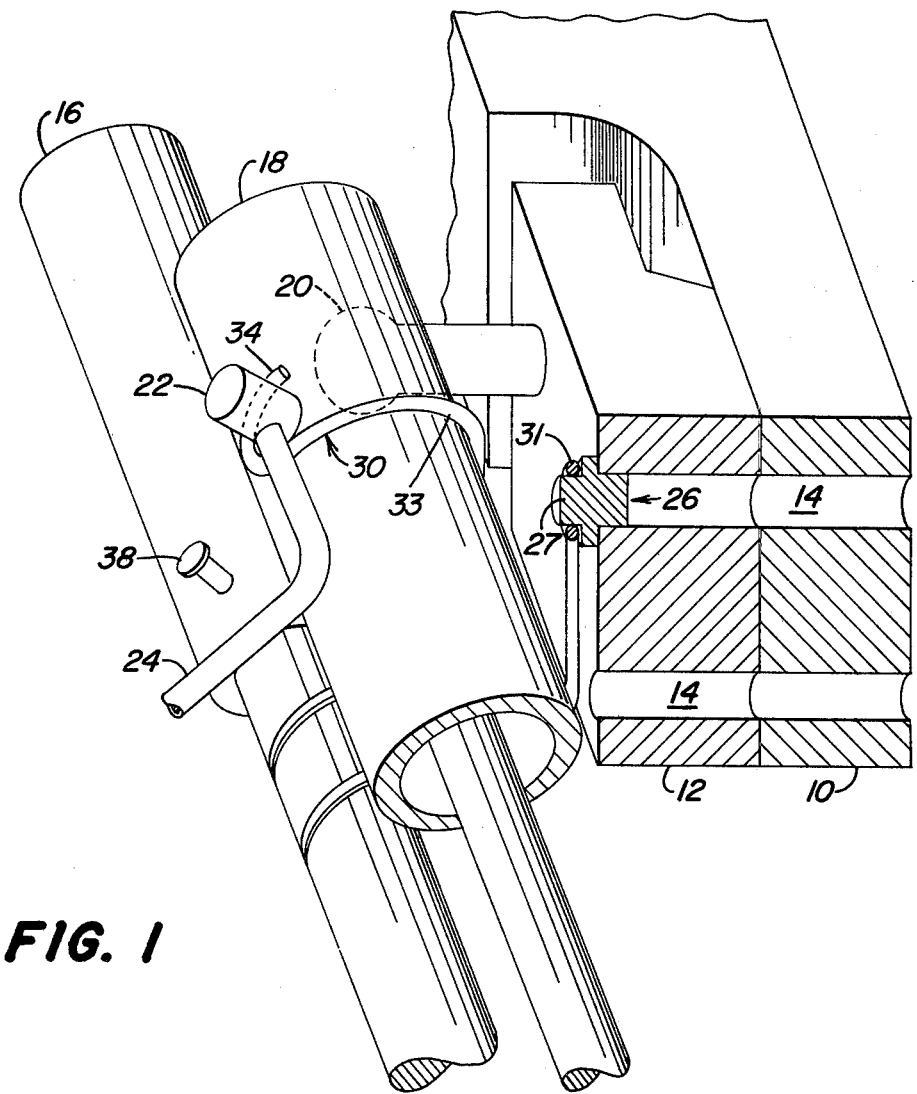
FIG. 1 shows a perspective view of the right-hand front axle with steering cylinder and track rod, in partial section transversely with respect to the direction of the axle, in the region of the mounting means.

FIG. 1 shows a substantially perspective view of the general arrangement. The axle lug 10 on the center member of the axle and the half axle 12 are shown in cross-section taken transversely with respect to the direction of the axle, in order clearly to show the arrangement and the function of the plug element 26 which is optionally employed. In this arrangement, the plug 26 is carried in an upper bore 14 in an upper row of holes. The axle lug 10 and the half axle 12 are of a rectangular or box shape, while the half axle 12 is adjustable in respect of track, for example in four stages, from one hole to another.

In that situation, some of the bores 14 are used for receiving screw bolts extending therethrough. It will be appreciated that the mounting means may also be used, for example, on a round telescopic axle having only one row of holes.

Figure 2:
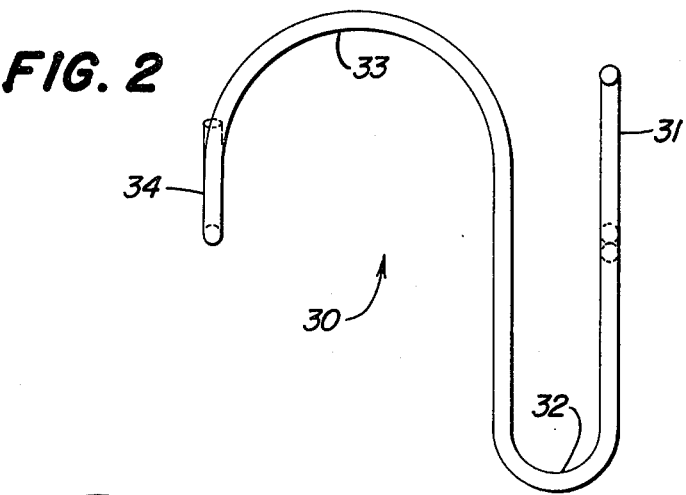
FIG. 2 shows a plan view of the mounting means, as viewed substantially along the axle.

The steering cylinder 18 is mounted to the half axle by means of a ball joint 20 which is shown in broken line in FIG. 1 but which, in itself, is concealed. It is adjustable, together with the half axle. The steering cylinder 18 is only incompletely shown at the front, just as is the adjustable-track track rod 16. The rest of the arrangement thereof, in conjunction with the steering arm, etc., is known, and does not need to be described in greater detail. In the embodiment illustrated, the steering cylinder 18 is fixedly connected to the half axle 12 by way of the ball joint 20 at the end of the cylinder member, the construction having to carry the compression and shearing forces which occur when the steering cylinder 18 is actuated for steering purposes. In addition, the steering cylinder 18 is secured to the steering arm at the hydraulic piston end of the assembly. In spite of this double mounting at the beginning and at the end of the hydraulic steering cylinder 18, there is still the above-mentioned possibility, when using the method of homokinetic mounting of the cylinder body by way of the ball joint 20, that the cylinder body, together with the connection or connections and the associated hydraulic conduit 24, may suffer from twisting, in particular, under the weight of the conduit 24, in the direction of the track rod 16 which, for the purposes of rigid transmission of force from the right-hand front wheel to the left-hand front wheel, is constantly reciprocated as steering takes place. In the most disadvantageous case, a retaining member or the like, as indicated at 38, which is provided for adjustment of the track rod, may be disposed in the region of the hydraulic conduit 24 and collide with the hydraulic conduit 24. Twisting of the cylinder 18 is avoided by using the mounting means 30 in accordance with the invention. The mounting means, which substantially comprises a spring arm 30, is used in the illustrated case, including a plug member 26, where the eye 31 of the mounting means is supported. Referring now to FIG. 2, a first loop portion 32 extends downwardly from the eye 31 to permit the spring arm 30 a certain degree of expansion for the purposes of accommodating certain relative movements with respect to the half axle 12, which are in the range of a few millimeters up to a maximum of about one centimeter. A second loop portion 33 is desirably adapted to the hydraulic cylinder 18 while a third loop portion 34 engages around the oil connection 22, thereby readily preventing twisting.

If there are two connections, it is recommended that the mounting means, according to the invention, be used on the oil connection 22 which is at the end, in the vicinity of the ball joint or the middle of the axle, as there would generally be larger relative movements to be compensated as between the steering cylinder 18 and the half axle 12, in the region of the connection towards the outside.

Depending on the track width or adjustment of the half axle 12 and the screw means thereof, it may be found that the hole 14, which is disposed at the right position for the connection 22, is occupied by a bolt. In that case, instead of using the plug member 26, the eye 31 can be supported on the head of the screw bolt. In this manner, the mounting means 30, in accordance with the invention, may be used for all track widths, virtually irrespective of the position of the half axle 12, with or without the plug member 26. Moreover, the configuration of the spring arm 30 is not restricted to use of the plug member 26 and an eye 31, which is adapted thereto, but on the contrary, other equivalent possible mounting on the half axle 12 may also be considered for releasably mounting the spring arm 30 in place.

FIG. 2 shows a plan view of the mounting means or spring arm 30 in a typical configuration for normal steering cylinders. In the illustrated arrangment, the distance of the eye 31 from the leg of the second loop portion 33 is from about 2 to 4 cm, while the radius of the second loop portion 33 corresponds to the outside radius of a conventional steering cylinder 18, as for example, about 30 mm.

Figure 3:
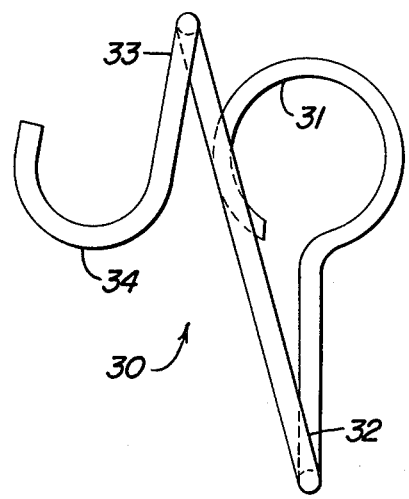
FIG. 3 shows a plan view of the mounting means, as viewed substantially transversely with respect to the axle.

FIG. 3 shows the same spring arm 30 in plan view turned through 90 degrees substantially transversely with respect to the axle. This view shows the eye 31, the inside diameter of which is approximately the same as the outside diameter of the head 27 of the plug member 26 or is adapted to the screw bolt or periphery of the nut employed when the plug member 26 is not used. Desirably, the diameter of the head 27 of the plug member and the diameter of the screw bolt or nut to be used should be of the same size, so that the eye 31 is a proper fit in all cases. FIG. 3 shows the distance in the axial direction between the center point of the eye 31 and the center point of the third loop portion 34, which must be adapted to the distance from the hole 14 to the connection 22, which occurs when the steering cylinder 18 is fitted in the normal manner. It is desirable for the third loop portion 34 to be extended somewhat beyond the semicircular configuration, as illustrated, in order to insure that it reliably engages around the connection 22.

Figure 4:
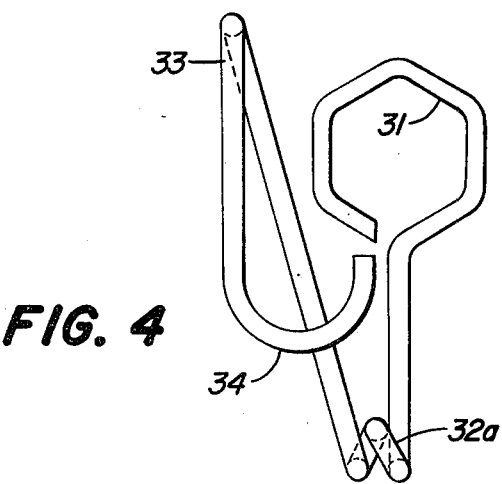
FIG. 4 shows a plan view of another form of mounting means, also as viewed transversely with respect to the axle.
Figure 5:
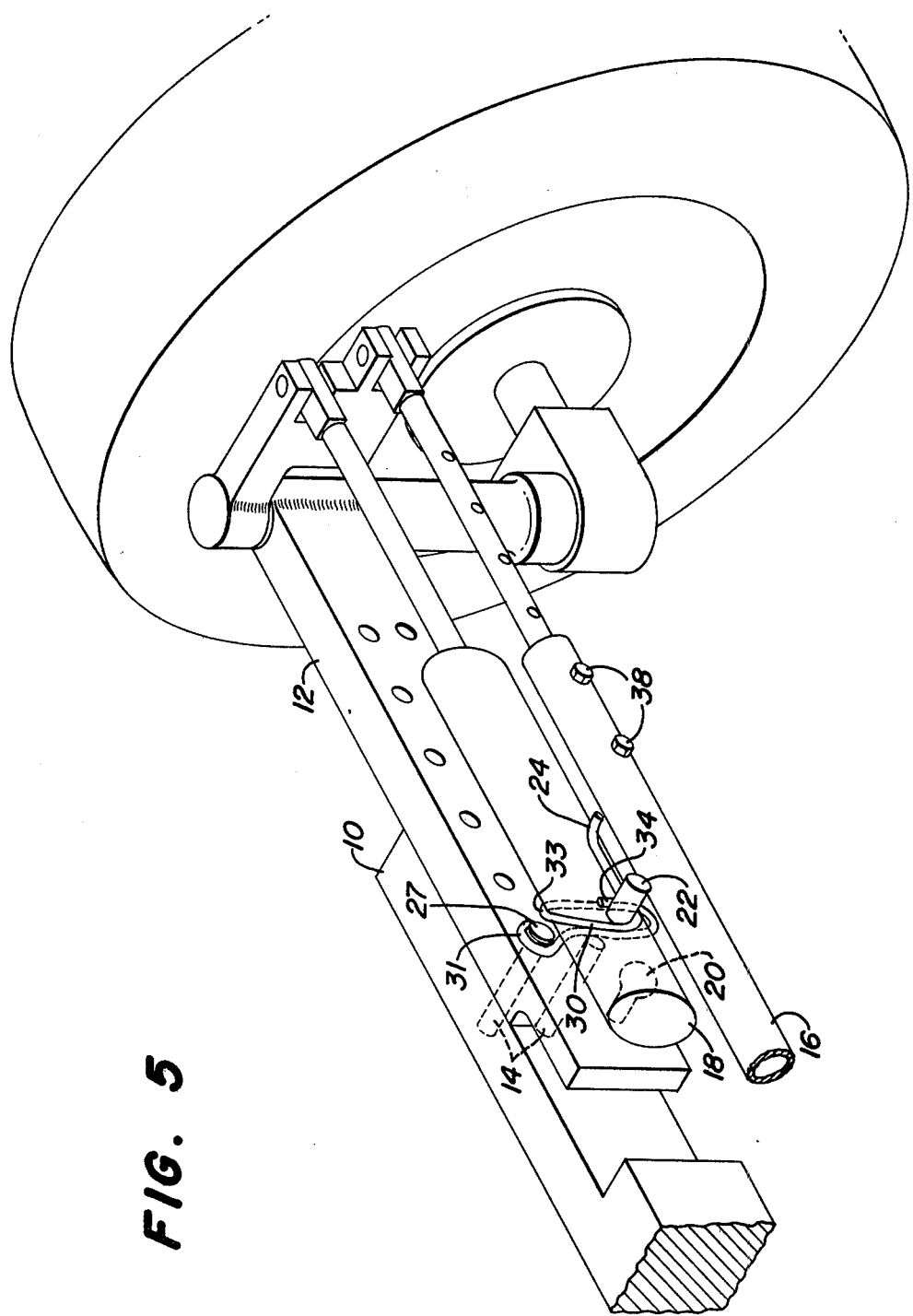
FIG. 5 shows a perspective view of an embodiment of the invention in its environment.

Finally, FIG. 4 shows an alternative form of the spring arm 30, the eye 31 being in the form of a hexagon. A non-round shape of this kind has the additional advantage that the spring arm 30 cannot tip. In general, however, the round shape of the eye 31 also gives satisfactory service. In FIG. 4, for the purposes of enhancing resiliency or increasing the spring travel, the first loop portion 32a is in the form a 360 degree loop or turn. In addition, there is a different axial distance between the eye 31 and the third loop portion 34 in the spring arm 30, shown in FIG. 4.

Generally, the use of the mounting means, according to the invention, is particularly valuable for combination with adjustable-track front axles which, accordingly have a correspondingly adjustable-track track rod. An adjustable-track front axle has a single or a double row of holes on the axle lug of the center member of the axle and on the connecting lug of the half axle, for screwing the center member of the axle and the half axle together by means of screw bolts or the like. The mounting of the spring arm which is at the axle end thereof can be adapted to that arrangement, and the spring arm, according to the invention, can be used with and without a plug element. In principle, it is also possible to use another method of anchoring the spring arm at the axle.

The mounting means, according to the invention, is of the utmost simplicity to use, it being recommended that it should generally be used on the inward end, that is to say, the mounting means is disposed in the vicinity of the end of the half axle which is towards the center member of the axle, and engages around the steering cylinder connection which is at the end towards the center member of the axle, if the steering cylinder has more than one connection. When adjusting the half axle, the spring arm, possibly including the plug element, with the half axle and steering cylinder, can be displaced by, for example, one or two holes, and refitted.

The mounting means is also inexpensive to produce and reliably prevents the steering cylinder body from twisting in a radial direction. It is capable of reliably securing the steering cylinder body and the hydraulic conduit connected thereto in a given position which avoids collision with the track rod.

The mounting means, according to the invention, may be used in connection with most hydraulic steering cylinders 18 or may be suitably adapted in accordance with the invention, in order to prevent any damage, such as to the hydraulic conduits 24, installed between adjustable-track half axle and a track rod.

I claim:

1. A mounting means for a hydraulic steering cylinder having substantially radially disposed hydraulic oil inlet and outlet connections which hydraulic steering cylinder is mounted by means of a ball joint in the region of an adjustable-track half axle of an agricultural machine, and extends substantially between and substantially parallel to the half axle and a track rod which is also adjustable in track, the hydraulic steering cylinder acting on a steering arm associated with an end of the axle, the mounting means comprising:

an anchoring member fixed in a bore provided in the adjustable-track half axle and projecting therefrom; and a spring member having an eye for engaging and receiving the anchoring member, an arm extending from the eye to a loop which engages and receives one of the oil inlet and outlet connections.

2. The mounting means of claim 1, wherein:

the anchoring member comprises a plug releasably fitted into the bore, the plug having a head received by and engaging the eye of the spring member.

3. The mounting means, according to claim 1, wherein:

the spring member has a first U-shaped loop portion which extends downwardly from the eye in a plane which is substantially normal to a longitudinal axis of the half axle and adjacent thereto, a second loop portion of part circular configuration, which is disposed in the same plane and which opens downwardly, the second loop portion having a radius substantially corresponding to an outer peripheral surface of the steering cylinder for engaging around an upper portion thereof and a third upwardly open substantially semi-circular loop portion which adjoins the second loop portion and lies in a plane substantially normal to the plane of the first and second loop portions for receiving one of the inlet and outlet connections.

4. The mounting means of claim 3 wherein:

the first U-shaped loop portion has a 360 degree coil portion for permitting flexing of the spring member transversely with respect to the direction of the axle.

* * * * *

UNITED STATES PATENT AND TRADEMARK OFFICE
CERTIFICATE OF CORRECTION

PATENT NO. : 4,445,586

DATED : 1 May 1984

INVENTOR(S) : Werner Schneider

Page 1 of 2

It is certified that error appears in the above-identified patent and that said Letters Patent is hereby corrected as shown below:

After Column 2, columns 3 and 4 as shown on the attached sheet should be inserted, but will apply to the Grant Only.

Signed and Sealed this

Twenty-ninth Day of January 1985

[SEAL]

Attest:

DONALD J. QUIGG

Attesting Officer

Acting Commissioner of Patents and Trademarks of the track rod 16 which, for the purposes of rigid transmission of force from the right-hand front wheel to the left-hand front wheel, is constantly reciprocated as steering takes place. In the most disadvantageous case, a retaining member or the like, as indicated at 38, which is provided for adjustment of the track rod, may be disposed in the region of the hydraulic conduit 24 and collide with the hydraulic conduit 24. Twisting of the cylinder 18 is avoided by using the mounting means 30 in accordance with the invention. The mounting means, which substantially comprises a spring arm 30, is used in the illustrated case, including a plug member 26, where the eye 31 of the mounting means is supported. Referring now to FIG. 2, a first loop portion 32 extends downwardly from the eye 31 to permit the spring arm 30 a certain degree of expansion for the purposes of accommodating certain relative movements with respect to the half axle 12, which are in the range of a few millimeters up to a maximum of about one centimeter. A second loop portion 33 is desirably adapted to the hydraulic cylinder 18 while a third loop portion 34 engages around the oil connection 22, thereby readily preventing twisting.

If there are two connections, it is recommended that the mounting means, according to the invention, be used on the oil connection 22 which is at the end, in the vicinity of the ball joint or the middle of the axle, as there would generally be larger relative movements to be compensated as between the steering cylinder 18 and the half axle 12, in the region of the connection towards the outside.

Depending on the track width or adjustment of the half axle 12 and the screw means thereof, it may be found that the hole 14, which is disposed at the right position for the connection 22, is occupied by a bolt. In that case, instead of using the plug member 26, the eye 31 can be supported on the head of the screw bolt. In this manner, the mounting means 30, in accordance with the invention, may be used for all track widths, virtually irrespective of the position of the half axle 12, with or without the plug member 26. Moreover, the configuration of the spring arm 30 is not restricted to use of the plug member 26 and an eye 31, which is adapted thereto, but on the contrary, other equivalent possible mounting on the half axle 12 may also be considered for releasably mounting the spring arm 30 in place.

FIG. 2 shows a plan view of the mounting means or spring arm 30 in a typical configuration for normal steering cylinders. In the illustrated arrangment, the distance of the eye 31 from the leg of the second loop portion 33 is from about 2 to 4 cm, while the radius of the second loop portion 33 corresponds to the outside radius of a conventional steering cylinder 18, as for example, about 30 mm.

FIG. 3 shows the same spring arm 30 in plan view turned through 90 degrees substantially transversely with respect to the axle. This view shows the eye 31, the inside diameter of which is approximately the same as the outside diameter of the head 27 of the plug member 26 or is adapted to the screw bolt or periphery of the nut employed when the plug member 26 is not used. Desirably, the diameter of the head 27 of the plug member and the diameter of the screw bolt or nut to be used should be of the same size, so that the eye 31 is a proper fit in all cases. FIG. 3 shows the distance in the axial direction between the center point of the eye 31 and the center point of the third loop portion 34, which must be adapted to the distance from the hole 14 to the connection 22, which occurs when the steering cylinder 18 is fitted in the normal manner. It is desirable for the third loop portion 34 to be extended somewhat beyond the semicircular configuration, as illustrated, in order to insure that it reliably engages around the connection 22.

Finally, FIG. 4 shows an alternative form of the spring arm 30, the eye 31 being in the form of a hexagon. A non-round shape of this kind has the additional advantage that the spring arm 30 cannot tip. In general, however, the round shape of the eye 31 also gives satisfactory service. In FIG. 4, for the purposes of enhancing resiliency or increasing the spring travel, the first loop portion 32a is in the form a 360 degree loop or turn. In addition, there is a different axial distance between the eye 31 and the third loop portion 34 in the spring arm 30, shown in FIG. 4.

Generally, the use of the mounting means, according to the invention, is particularly valuable for combination with adjustable-track front axles which, accordingly have a correspondingly adjustable-track track rod. An adjustable-track front axle has a single or a double row of holes on the axle lug of the center member of the axle and on the connecting lug of the half axle, for screwing the center member of the axle and the half axle together by means of screw bolts or the like. The mounting of the spring arm which is at the axle end thereof can be adapted to that arrangement, and the spring arm, according to the invention, can be used with and without a plug element. In principle, it is also possible to use another method of anchoring the spring arm at the axle.

The mounting means, according to the invention, is of the utmost simplicity to use, it being recommended that it should generally be used on the inward end, that is to say, the mounting means is disposed in the vicinity of the end of the half axle which is towards the center member of the axle, and engages around the steering cylinder connection which is at the end towards the center member of the axle, if the steering cylinder has more than one connection. When adjusting the half axle, the spring arm, possibly including the plug element, with the half axle and steering cylinder, can be displaced by, for example, one or two holes, and refitted.

The mounting means is also inexpensive to produce and reliably prevents the steering cylinder body from twisting in a radial direction. It is capable of reliably securing the steering cylinder body and the hydraulic conduit connected thereto in a given position which avoids collision with the track rod.

The mounting means, according to the invention, may be used in connection with most hydraulic steering cylinders 18 or may be suitably adapted in accordance with the invention, in order to prevent any damage, such as to the hydraulic conduits 24, installed between adjustable-track half axle and a track rod.

I claim:

1. A mounting means for a hydraulic steering cylinder having substantially radially disposed hydraulic oil inlet and outlet connections which hydraulic steering cylinder is mounted by means of a ball joint in the region of an adjustable-track half axle of an agricultural machine, and extends substantially between and substantially parallel to the half axle and a track rod which is also adjustable in track, the hydraulic steering cylinder acting on a steering arm associated with an end of the axle, the mounting means comprising: